United States Patent [19]

Vanderlaan

[11] Patent Number: 4,822,849

[45] Date of Patent: Apr. 18, 1989

[54] LOW SHRINK HYBRID RESINS

[75] Inventor: Douglas G. Vanderlaan, Jacksonville, Fla.

[73] Assignee: Reichhold Chemicals, Inc., White Plains, N.Y.

[21] Appl. No.: 80,776

[22] Filed: Aug. 3, 1987

[51] Int. Cl.$^4$ ............................................. C08G 67/06
[52] U.S. Cl. ......................................... 525/17; 525/25; 525/27; 525/28; 525/36; 273/26 B; 273/63 G
[58] Field of Search ....................... 525/28, 36, 28, 36, 525/17, 25, 27; 273/26 B, 63 G

[56] References Cited

U.S. PATENT DOCUMENTS

| | | | |
|---|---|---|---|
| 3,007,894 | 11/1961 | Bunge | 525/28 |
| 3,318,727 | 5/1967 | Boenig | 428/334 |
| 3,849,367 | 11/1974 | Mayer | 525/40 |
| 4,595,725 | 7/1986 | Hess | 525/33 |

FOREIGN PATENT DOCUMENTS 61-019619  1/1986  Japan .

OTHER PUBLICATIONS

Thompson, E. J. et al, Isayanate Thickened Sheet Molding Compound, 37th Annual Conf, Reinforced Plastics/Composite Inst., The Society of Plastics Ind. (1982), pp. 1–6.
Chem Abst 68:3541s (1968), Polyester Resin Modified by Isocyanate.
Chem Abst 68:115428s (1968) Crosslinked Polyesters.
Chem Abst 66:38420u (1967).
Edwards, H. R., High Performance Urethane Modified Unsaturated Polyesters, British Plastics Fed. (1984) pp. 37–45.
Hybrid Resins, Amoco Chemical Corp. (no date).
Edwards, H. R., The Use of Isophthalic Unsaturated Polyester Urethane Hybrids in Conventional molding Techniques, SPE 44th Annual Tech. Conf. & Exhibit (1986) pp. 1326–1330.
Edwards, H. R., Handling & Physical Properties of Hybrid Polyesters, 39th Annual Conf, Reinforced Plastics/Composite Institute, The Society of Plastics Ind. (1984) pp. 1–8.

Primary Examiner—Patricia Short
Attorney, Agent, or Firm—Rodman & Rodman

[57] ABSTRACT

Unsaturated polyester compositions comprising (a) an unsaturated polyester prepolymer and (b) a vinyl monomer copolymerizable with the prepolymer, which are cured by addition of (c) a polyisocyanate, (d) a peroxide catalyst and, optionally, (e) a peroxide activator and a urethane catalyst.

16 Claims, No Drawings

LOW SHRINK HYBRID RESINS

BACKGROUND OF THE INVENTION

1. Field of the Invention

The present invention relates to a class of unsaturated polyester compositions termed hybrid resins. The term "hybrid" refers to the incorporation into a single new polymer the chemical groups and properties of two different polymer species.

2. Description of the Prior Art

Hydroxyl terminated unsaturated polyesters can be cured by reacting these resins with polyfunctional isocyanates and either concurrently or in a separate step, cross-linking the polyester via the unsaturated groups with a reactive ethylenically unsaturated monomer using a radical initiator. Hybrid resins of this type are described in the following papers:

(1) High Performance Urethane Modified Unsaturated Polyesters, H. R. Edwards, presented at the British Plastics Federation (1984);

(2) Hybrid Resins, undated publication of Amoco Chemical Corp.;

(3) The Use of Isophthalic Unsaturated Polyester Urethane Hybrids in Conventional Molding Techniques, H. R. Edwards, proceedings of the SPE 44th Annual Technical Conference and Exhibit, pages 1326–1330 (1986);

(4) Handling and Physical Properties of Hybrid Polyesters, H. R. Edwards, 39th Annual Conference, Reinforced Plastics Composite Institute, The Society of the Plastics Industry, Session 8-C, pages 1-8 (January 1984);

(5) Isocyanate Thickened Sheet Molding Compound, E. J. Thompson, L. M. Abevino and W. J. Fomissy, 37th Annual Conference, Reinforced Plastic Composite Institute, The Society of the Plastics Industry, Session 1-A, pages 1-6 (January 1982).

Of the above papers, paper number (1) relates to hybrid resins formed from various molar ratios of maleic acid to isophthalic acid in the unsaturated polyester. Paper number (2) describes the preparation of various hybrid resin molded compounds in which the polyester used has various ratios of polyol to acid. Paper number (3) discloses various hybrid molding compositions at different ratios of maleic acid to isophthalic acid in the polyester. Paper number (4) discloses the physical properties of various hybrid polyesters. Paper number (5) discusses the use of hybrid resins in various molding compositions using different fillers.

Compositions of the type described in the foregoing papers by Edwards when cured, tend to shrink unduly, which has limited their commercial application. For example, when attempts were made to use polyester isocyanate styrene compositions of the types described in the prior art to make a molded shell on a bowling ball, such attempts were unsuccessful. This was because the shell on the bowling ball cracked upon curing. The high degree of shrinkage of such previously described compositions upon curing also renders them unsuitable for many other applications as such shrinkage can cause reinforcing glass fibers to become visible at the surface and lead to a poor surface smoothness, or it can cause cracks to form in non-reinforced molded articles.

U.S. Pat. No. 4,595,725 to Hess et al discloses polyester resins formed from at least two glycols and at least one branching agent and a dicarboxylic acid residue containing fumaric acid residues.

U.S. Pat. No. 3,318,727 to Boenig et al discloses a polyester polyisocyanate composition for use as a bowling ball outside cover. The molar ratios of isophthalic acid and maleic acid shown in Boenig differ from those in the present invention.

U.S. Pat. No. 4,228,251 to Maekawa et al, discloses a resin composition containing polystyrene with unsaturated polyester resins to provide a stable complete one-pack type resin composition having low shrink properties.

U.S. Pat. No. 3,455,857 to Holzrichter, discloses vinyl modified alkyd or urethane resin compositions including a novel intermediate.

U.S. Pat. No. 3,806,490 to Kajiura et al, discloses a prepolymer polyester-polybutadiene composition used to produce shaped articles described as being free from cracks.

U.S. Pat. No. 4,242,415 to Feltzin et al, describes various amine terminated liquid polymers having an average of about 1.7 to 3 amine groups per molecule.

U.S. Pat. No. 4,287,116 to Burns, described the use of vinyl ester urethane resins for high impact strength applications such as automobile bumpers.

French Patent No. 1,477,822 to Reichhold-Beckacite, cited in Chemical Abstracts, Vol. 68: 3541S (1968), relates to various polyester resins which are modified by reaction with isocyanate.

British Patent No. 1,110,537 to Dayton Research, cited in Chem. Abs. 68:115428s (1968), discloses that unsaturated polyesters are treated before or during cross-linking with an amount of diisocyanate equivalent to the free hydroxyl groups in the polyester.

Japanese Patent No. 15316 (1966) to Toyo Rubber Industry Co., cited in Chem. Abs. 66:38420U (1967), discloses reacting unsaturated polyesters containing terminal hydroxyl groups with polyfunctional organic isocyanates and then reacting the products with vinyl monomers.

U.S. Pat. No. 4,584,363 to Goel et al, discloses thermoset resins made from polymerizing a mixture of a polyol from the reaction of an olefinically unsaturated polycarboxylic acid and bicyclic amide acetal with a polyisocyanate and a vinyl monomer.

Japanese Patent No. 86/19619 to Hitachi Chemical Co., cited in Chem. Abs. 105:61515e (1986), relates to resin compositions comprising unsaturated polyester resins and epoxy resins thickened with a polyfunctional isocyanate compound.

SUMMARY OF THE INVENTION

The present invention relates to an improvement in unsaturated polyester compositions comprising (a) an unsaturated polyester prepolymer and (b) a vinyl monomer copolymerizable with the prepolymer, which are cured by addition of (c) a polyisocyanate, (d) a peroxide catalyst and, optionally, (e) a peroxide decomposition promoter and a urethane catalyst. The inventive composition is characterized by low shrinkage on curing.

DISCLOSURE OF THE PREFERRED EMBODIMENTS

In accordance with the present invention, it has been found that improved resin compositions with a low degree of shrinkage on curing can be obtained if the content of unsaturated polycarboxylic acid in the hydroxyl terminated polyester is reduced to a level below that previously considered necessary.

The compositions of the present invention provide a low degree of shrinkage on curing, on the order of 1% or less, and can be used to make objects or articles having a molded shell which resists cracking while curing. Specific applications for the composition of the present invention include the manufacture of bowling balls and baseball bats. It has also been found that the molded compositions of this invention can used reduced amounts of the ethylenically unsaturated monomer than previously thought acceptable, without adversely affecting the properties.

According to a preferred embodiment of this invention, an hydroxyl functional unsaturated polyester resin composition is provided comprising:

(A) at least 70 parts by weight of an alpha,betaethylenically unsaturated polyester and (B) not more than 30 parts by weight of an ethylenically unsaturated monomer polymerizable with (A).

The alpha,beta-ethylenically unsaturated polyester can be the reaction product of:

(a) at least one alpha,beta-ethylenically unsaturated dicarboxylic acid and/or its anhydride, diester, or corresponding derivative, and (b) at least one other non-alpha,betatheylenically unsaturated diacarboxylic or polycarboxylic acid, or anhydride, or diester or corresponding derivative, and (c) at least one polyol.

The alpha,beta-ethylenically unsaturated dicarboxylic acid component of the resin composition comprises about 10 to 50 mole percent of the total dicarboxylic acid components, (a) plus (b). The amount of polyol used is such that the ratio of hydroxyl groups to the sum of the carboxyl groups of (a) plus (b) is greater than 1, preferably 1.3. to 1.4.

The resin can be cured by the addition of a radical initiator and a polyisocyanate in an amount such that the molar ratio of isocyanate groups to the hydroxyl groups varies from about 0.5 to 2.0, preferably about 0.8 to 1.2.

It has been found that the reduced shrinkage upon curing of such hybrid resins is related to the degree of unsaturation in the polyester, and to the content of the ethylenically unsaturated reactive monomer. Thus, by reducing the degree of unsaturation in the polyester to levels well below those generally used or recommended, resins can be produced in which the linear shrinkage is reduced to less than 1%. Further improvement in reduction of shrinkage can be obtained by reducing the content of the reactive monomer with the prescribed ranges.

The inventive resins are uniquely suitable for applications wherein toughness and flexibility is desirable, but where shrinkage is a definite negative factor, and causes processing difficulties such as cracking or exposure of reinforcing glass fibers.

Compositions within the scope of this invention can be used to produce molded objects, such as bowling balls or baseball bats, which could not otherwise be made using conventional hybrid resins due to the high degree of shrinkage which leads to cracking upon curing. The cured compositions of this invention, however, shrink much less while retaining the favaorable physical properties of high flexural and tensile strength which are characteristic of polyester urethane hybrid resins.

Alpha,beta-ethylenically unsaturated dicarboxylic acids or their anhydrides (a) which are suitable in forming the alpha,beta-ethylenically unsaturated polyester (A), include maleic acid, fumaric acid, itaconic acid, methyl maleic acid, and other alpha,beta-ethylenically unsaturated acids.

The carboxylic acids or their anydrides (b), free from alpha,beta-ethylenic unsaturation which are suitable for use include aliphatic dicarboxylic or polycarboxylic acids containing from 2 to 12 carbon atoms and cycloaliphatic saturated and unsaturated and aromatic dicarboxylic acids containing from 8 to 12 carbon atoms or the corresponding anhydrides. Examples of such acids and anhydrides are phthalic acid or anhydride, isophthalic acid, terephthalic acid, adipic acid, dodecanoic acid, glutaric acid, endomethylenetetrahydrophthalic anhydride and succinic acid or anhydride. Diesters of these acids with volatile alcohols can also be used; for example, dimethylterephthalate.

Preferred polyols include glycols with two primary hydroxyl groups such as ethylene gylcol, diethylene gylcol, 1,4-butanediol, 1,3-propanediol, 1,5-pentanediol, 1,6-hexanediol and neopentyl glycol. Glycols with one or two secondary hydroxyl groups, such as 1,2-propylene glycol can also be used, but are less suitable due to the slower rate of reaction of secondary hydroxyl groups with isocyanates. Other polyols such as glycerol, pentaerythritol, trimethylolethane, trimethylolpropane, 1,2,6-hexanetriol, sorbitol, inositol, and polyvinyl alcohol can also be used.

The ethylenically unsaturated monomers suitable for use include styrene, ortho, meta and para alkyl styrenes, divinylbenzene, vinyl toluene, alpha-methyl styrene, chlorostyrenes, vinyl pyridine, acrylic acid and methacrylic acid and/or esters thereof, diallylphthalate and isophthalic acid diallyl ester.

Polyisocyanates suitable for use include aliphatic, cycloaliphatic, and aromatic diisocyanates containing 6 to 18 carbon atoms, for example, 1,6-hexamethylene diisocyanate, 2,4' and 4,4' dicyclohexl-methane diisocyanate, "isophorone" diisocyanate, 2,4- and 2,6-tolylene diisocyanate (TDI), 2,4' and 4,4'-diphenylmethane diisocyanate (MDI) and mixtures thereof. Higher polyisocyanates, and those whose functionality has been reduced to two by reaction with compounds capable of reacting with isocyanates, such as alcohol, can also be used.

The polyester compositions suitable for use in the invention can be produced by methods well known in the art, including a one-stage reaction wherein a mixture of the appropriate glycols and dicarboxylic acids is heated at about 150°-230° C. for about 5 to 20 hours with water being continuously distilled from the reaction vessel.

The polyester generally has an acid number of less than 40, preferably about 0.1 to 5.0. The hydroxyl number of the polyester can vary from about 20 to about 300, preferably about 50 to 150.

A two-stage procedure can also be used in which the non-alpha,beta-ethylenically unsaturated dicarboxylic acids or derivates thereof are reacted with a polyol in the first stage, followed by reaction of the alpha-beta ethylenically unsaturated dicarboxylic acid or derivative in the second stage.

The removal of water formed in the esterification reaction can be facilitated by including a solvent such as xylene, which forms an azeotrope with water. Catalysts which promote esterification reactions, such as para-toluene sulfonic acid or certain tin compounds, can be added to shorten the required reaction time.

The reaction is generally carried out under a blanket of inert gas or with a continuous flow of an inert gas such as nitrogen, to facilitate the removal of water and to prevent discoloration from undesirable reactions with oxygen.

Upon completion of the esterification reaction, a suitable amount of a radical inhibitor, such as p-hydroquinone, can be added in order to prevent premature cross linking. The unsaturated polyester thus formed is blended with one or more ethylenically unsaturated monomers as previously described, which can contain an appropriate polymerization inhibitor, such as para-benzoquinone. In general, the polymerization is conducted to an acid number of less than about 5.

The molecular weight (Mn) of the unsaturated polyesters can be determined by gel permeation chromatography using polystyrene standards, or by end group analysis and can range from about 300 to 20,000, preferably from about 500 to 2,000.

The resins can be combined with inorganic fillers such as calcium carbonate, talcum, and aluminum trihydroxide. They can also be combined with reinforcing fibers such as glass fibers or organic fibers. Other additives can be used such as pigments, mold release agents such as zinc stearate, UV-absorbers and thixotropic agents.

For the final curing reaction, a polyisocyanate as previously described can be added and the mixture cured in a mold. Catalysts which promote the formation of urethane linkages by reaction of isocyanate groups with hydroxyl groups, such as dibutyltin dilaurate can be used. Free radical polymerization initiators can also be used, such as benzoyl peroxide, methyl ethyl ketone hydroperoxide, cumene hydroperoxide, tert-butyl peroxybenzoate, cyclohexanone hydroperoxide, and azobisisobutyrodinitrile.

Peroxide decomposition promoters can also be used, including metal salts such as cobalt naphthenate and cobalt octoate, and tertiary amines such as dimethylaniline, diethylaniline, and dimethyl-p-toluidine.

The compositions of the invention can be molded by various techniques such as sheet molding, resin transfer molding and reaction injection molding. When the compositions are used in sheet molding, the hydroxyl terminated unsaturated polyester blended with the suitable reactive monomer is typically combined with one or more inorganic fillers such as calcium carbonate. The filled composition can also contain a peroxide initiator, glass fibers for reinforcement, diisocyanate, pigments and a mold release agent.

The diisocyanate is added in an amount such that the hydroxyl to isocyanate equivalent ratio is less than about 1, typically about 0.6 to 0.9. The mixture begins to react or thicken due to the reaction of the hydroxyl groups with isocyanate groups to yield a paste which is sufficiently fluid to be moldable. The paste is then finally cured in a heated compression molder.

In Example 1, which follows, the mole percent of unsaturated dicarboxylic acid, i.e., maleic acid, in the mixture of dicarboxylic acids, was 25%. Provided that the molar ratio is significantly below 50%, other molar ratios can be used. Thus, the molar ratio of the unsaturated acid in the mixture of carboxylic acids can generally range from about 15% to 35%.

The desired quantity of unsaturated acid in the dicarboxylic acid mixture is such that a suitable degree of crosslinking occurs in the cured polymer without giving rise to excessing shrinkage upon curing.

It has also been found that a low level of ethylenically unsaturated monomer, preferably less than 35% of the polyester/styrene blend, as well as a low level of unsaturated acid, preferably less than about 50% of the total dicarboxylic acid, act synergistically to reduce shrinkage.

The composition of Example 2 was suitable as a shell for bowling balls. In making the bowling ball, a suitable core was inserted in a spherical mold and the inventive composition was molded around the core. Because of its low degree of shrinkage on molding, the cured composition, when molded as a shell on a bowling ball, did not crack and the bowling balls were well suited for use.

The fact that the hybrid resin produced has low shrinkage characteristics, makes the addition of a thermoplastic low profile additive either unnecssary or necessary only in reduced amounts that are less than that ordinarily used to achieve smooth, low profile surfaces.

The following examples will serve to illustrate the invention. All parts and percentages are by weight unless otherwise noted.

EXAMPLE 1

Preparation of Hydroxyl Terminated Unsaturated Polyester

In a 12 liter four necked flask equipped with a stirrer, $N_2$ inlet, thermometer, and fractionating distillation column, 45.7 moles of diethylene glycol was heated to 90° C. To the heated glycol was added 26.0 moles of isophthalic acid and 8.67 moles of maleic anhydride. This mixture was heated, with stirring under a nitrogen flow, to 210° C., with distillation of water until the acid number of the uncured hydroxyl terminated unsaturated polyester produce reached 2.6 mg KOH/gram. It was then cooled to 150° C., inhibited with 2.23 grams of hydroquinone, and blended into a solution of 2127 grams of styrene monomer with 0.56 grams of p-benzoquinone. The styrene blended product had an acid number of 2.6 mg KOH/gram and an hydroxyl number of 130, based solids. It had a viscosity of 2080 centipoise.

EXAMPLE 2

Preparation of Cured Hybrid Resin (a) A blend of 70.6 parts hydroxyl terminated unsaturated resin prepared as in Example 1, 1.4 parts of a 40% dispersion of benzoyl peroxide in a phthalate plasticizer, and 4.8 parts of a 50% dispersion of powdered molecular sieves in a plasticizer base sold under the trademark of BAYLITH L PASTE from Mobay, Inc., was allowed to stand for 12 hours. To this blend was then added 23.1 parts of a modified mixture of isomers of diphenylmentane diisocyanate, with a functionality per molecule of about 2.0, sold under the trademark of MDI (ISONATE 181) from Dow Chemical Co., and 0.14 parts of diethylaniline. This mixture was cured between glass plates to make ⅛ inch castings, cured for 3 hours at room temperature, followed by post curing for 2 hours at 70° C. The physical properties of these castings are given in Table 1.

TABLE 1

| | |
|---|---|
| Barcol Hardness | 15–21 |
| Flexural Strength, psi | 14,250 |
| Flexural Modulus, psi $\times 10^5$ | 4.46 |
| Tensile Strength, psi | 9,000 |
| Tensile Modulus, psi $\times 10^5$ | 4.50 |

TABLE 1-continued

| | |
|---|---|
| Elongation, % at break | 3.90 |
| Izod Impact, Notched, ft.-lb/inch | 0.755 |

The linear shrinkage of the resin upon curing was 0.126%.

(b) In another example following the same procedure as (a), the linear shrinkage was 2.02% for a hybrid made from an hydroxyl terminated unsaturated resin made from isophthalic acid, maleic anhydride, and diethylene glycol in mole ratios of 0.5:0.5:1.32 respectively, and diluted with styrene to a total styrene content of 35% and cured using equivalent levels of isocyanate, initiator and promoter at the same time and temperature.

EXAMPLE 3

Following the general procedure of Example 1, hydroxyl terminated unsaturated polyester was made from 8.27 moles of isophthalic acid, 8.28 moles of maleic anhydride, and 21.84 moles of diethylene glycol. This reaction was run to an acid number of 2.5 mg KOH/gram, then blended with 0.45 grams of hydroquinone, 1022 grams of styrene monomer, and 0.092 grams of p-benzoquinone to give a product with a viscosity of 1450 centipoise.

A cured hybrid was made using 72.5 parts of the above product, 1.7 parts of a 50% dispersion of benzoyl peroxide in a phthalate plasticizer, 5.0 parts of BAYLITH L PASTE, 24.7 parts of MDI (ISONATE 181) and 0.14 pats of diethylaniline, and following the general procedure of Example 2. The linear shrinkage of this resin upon curing was 1.45%.

EXAMPLE 4

A cured hybrid was made using 60 parts of the hydroxyl terminated unsaturated polyester and styrene blend from Example 1, 14 parts of styrene monomer, 5.0 parts of BAYLITH L PASTE, 0.13 parts of diethylaniline, 20 parts of MDI (ISONATE 181) and 1.4 parts of a 50% dispersion if benzoyl peroxide in a phthalate plasticizer, and following the general procedure of Example 2. The linear shrinkage of the resin upon curing was 1.10%.

TABLE 2

| Example Number | % Styrene* | Molar ratios of IPA/MA/DEG | Linear** Shrinkage |
|---|---|---|---|
| 2 (a) | 20 | 0.75/0.25/1.32 | 0.126% |
| 3 | 20 | 0.50/0.50/1.32 | 1.45% |
| 4 | 35 | 0.75/0.25/1.32 | 1.10% |
| 2 (b) | 35 | 0.50/0.50/1.32 | 2.02% |

*In hydroxyl terminated resin/styrene blend
**Linear shrinkage was measured by curing resins in a 10 inch long half-cylindrical steel mold with an inner diameter of 2 inches. After curing overnight the length of the cured resin was compared to the internal mold length.

What is claimed is:

1. An hydroxyl functional unsaturated polyester resin composition for use in a molding composition consisting essentially of:
(A) at least 70 parts by weight by an alpha, betaethylenically unsaturated polyester having an acid number of less than 40 and an hydroxyl number of about 20 to 300, and a molecular weight of about 300 to 20,000, consisting essentially of the reaction product of:
   (a) at least one alpha,beta-ethylenically unsaturated dicarboxylic acid, anhydride, or derivative thereof;
   (b) at least one other non-alpha,betaethylenically unsaturated dicarboxylic acid, polycaboxylic acid, anhydride, diester or corresponding derivative thereof;
   (c) at least one polyol;
(B) not more than 30 parts by weight of an ethylenically unsaturated monomer polymerizable with (A);
(C) a polyisocyanate in an amount such that the molar ratio of hydroxyl groups to isocyanate varies from about 0.5 to 2.0;
(D) a radical initiator; and
wherein the amount of the alpha, beta-ethylenically unsaturated carboxylic acid component of said composition varies from at least about 20 to about 35 mole % of the total dicarboxylic acid residue of said composition; and wherein said composition has shrinkage upon molding of less than 1%, and a Barcol hardness of about 15 to 21.

2. The composition of claim 1, wherein the amount of polyol used is such that the ratio of hydroxyl groups in the polyol (c) to the sum of carboxyl groups in (a) and (b) is greater than 1.

3. The composition of claim 1, wherein the polyol is at least one glycol selected from the group consisting of ethylene glycol, diethylene glycol, 1,4-butanediol, 1,3-propanediol, 1,5-pentanediol, 1,6-hexanediol and neopentyl glycol.

4. The composition of claim 1, wherein the alpha, beta-ethylenically unsaturated carboxylic acid is maleic anhydride, the non-ethylenically unsaturated carboxylic acid isophthalic acid, the polyhydric alcohol is diethylene glycol and the ethylenically unsaturated monomer is styrene.

5. The composition of claim 1, wherein (a) the alpha,-beta-ethylenically unsaturated dicarboxylic acid is selected from the group consisting of maleic acid, fumaric acid, itaconic acid, methyl maleic acid and mixtures thereof.

6. The composition of claim 1, wherein (b) is selected from the group consisting of phthalic acid, phthalic anhydride, isophthalic acid, terephthalic acid, adipic acid, dodecanoic acid, glutaric acid, endomethylenetetrahydrophthalic anhydride, succinic acid, succinic anhydride, dimethylterephthalate and mixtures thereof.

7. The composition of claim 2, wherein said polyol is selected from the group consisting of glycerol, pentaerythritol, trimethylolethane, trimethylolpropane, 1,2,6-hexanetriol, sorbitol, inositol, polyvinyl alcohol and mixtures thereof.

8. The composition of claim 1, wherein the ethylenically unsaturated monomers are selected from the group consisting of styrene, ortho, meta and para alkyl styrenes, divinylbenzene, vinyl toluene, alpha-methyl styrene, chlorostyrenes, vinyl pyridine, acrylic acid, methacrylic acid, esters of acrylic acid, esters of methacrylic acid, diallylphthalate, isophthalic acid diallyl ester and mixtures thereof.

9. The composition of claim 1, wherein the polyisocyanate is an aliphatic, cycloaliphatic, or aromatic diisocyanate containing 6 to 18 carbon atoms, selected from the group consisting of 1,6-hexamethylene diisocyanate, 2,4' and 4,4' dicyclohexyl-methane diisocyanate, isophorone diisocyanate, 2,4- and 2,6-tolylene diisocyanate, 2,4' and 4,4'-diphenylmethane diisocyanate and mixtures thereof.

10. The composition of claim 1, wherein the hydroxyl functional unsaturated polyester has an acid number of about 0.1 to 5.0 and an hydroxyl number of about 50 to 150.

11. The composition of claim 1, wherein the hydroxyl functional unsaturated polyester has a molecular weight of about 500 to 2,000.

12. The composition of claim 1, wherein the tensile strength is about 9,000 psi and the % elongation at break is about 3.90.

13. A molded article formed from the composition of claim 1, selected from the group consisting of bowling balls and baseball bats.

14. The composition of claim 1, wherein the radical initiator is selected from the group consisting of benzoyl peroxide, methyl ethyl ketone hydroperoxide, cumene hydroperoxide, tert-butyl peroxybenzoate, cyclohexanone hydroperoxide, and azobisisobutyrodinitrile.

15. The composition of claim 1, also including a peroxide decomposition promoter.

16. The composition of claim 15, wherein the peroxide decomposition promoter is selected from the group consisting of cobalt naphthenate, cobalt octoate, dimethylaniline, diethylaniline, dimethyl-p-toluidine, and mixtures thereof.

* * * * *

UNITED STATES PATENT AND TRADEMARK OFFICE
CERTIFICATE OF CORRECTION

PATENT NO. : 4,822,849

DATED : April 18, 1989

INVENTOR(S) : Douglas G. Vanderlaan

It is certified that error appears in the above-identified patent and that said Letters Patent is hereby corrected as shown below:

In title sheet,
    line following "Other Publications", change "Isayanate" to --Isocyanate--.

At column 6,
    line 36, change "produce" to --product--.

At column 6,
    line 42, change "based solids" to --based on solids--.

At column 7,
    line 31, change "pats" to --parts--.

Signed and Sealed this

Second Day of January, 1990

Attest:

JEFFREY M. SAMUELS

Attesting Officer      Acting Commissioner of Patents and Trademarks